United States Patent [19]

Herr et al.

[11] 4,016,441
[45] Apr. 5, 1977

[54] LINEAR MOTOR

[75] Inventors: John Addison Herr, Garwood; Wolfgang Jaffe, Roselle Park; Allan Matthew Dob, Clifton; Philip Francis Minalga, Piscataway; Kenneth Douglas Adams, Madison; William Lee Herron, Elizabeth, all of N.J.

[73] Assignee: The Singer Company, New York, N.Y.

[22] Filed: May 19, 1976

[21] Appl. No.: 687,858

[52] U.S. Cl. .................................. 310/13; 310/27
[51] Int. Cl.² ........................................ H02K 33/18
[58] Field of Search ............................ 310/12–14, 310/27, 154

[56] References Cited
UNITED STATES PATENTS

| | | | |
|---|---|---|---|
| 3,470,399 | 9/1969 | Johnson et al. | 310/13 |
| 3,659,124 | 4/1972 | Lathrop | 310/13 |
| 3,735,163 | 5/1973 | Dijkstra et al. | 310/13 |
| 3,743,870 | 7/1973 | Hunt | 310/13 |
| 3,751,693 | 8/1973 | Gabor | 310/13 |
| 3,760,206 | 9/1973 | Hertrich | 310/13 |
| 3,816,777 | 6/1974 | Metzgar et al. | 310/13 |
| 3,889,139 | 6/1975 | Hughes | 310/27 X |

*Primary Examiner*—Donovan F. Duggan
*Attorney, Agent, or Firm*—Edward L. Bell; Robert E. Smith; Julian Falk

[57] ABSTRACT

A linear motor for use, for example, in sewing machines for controlling needle vibration as to amplitude and/or fabric feed both in magnitude and direction, said motor comprising a frame having an internal central pole piece spaced intermediate two permanent magnets of the high energy product type which are attached to the frame, the central pole piece providing supporting means for movable coil member integrally formed with connecting arms pivotally fastened to an actuator arm carried on a pivoted potentiometer shaft. The permanent magnets are secured through their own magnetism to the frame and are each locked in proper orientation by a non-metallic retainer which is locked to the magnet and additionally formed with a closure panel, said closure panels cooperating with the motor frame completely to enclose a compartment for the movable coil member effecting both a minimum external leakage field and a dust proof unit.

8 Claims, 4 Drawing Figures

4,016,441

LINEAR MOTOR

BACKGROUND OF THE INVENTION

Conventional linear motors are designed either for heavy duty output where size of unit, power consumption, inertia, diameter size of core, reactance speed, etc., are of small consequence, or for extremely light duty output such as the type that is used for electromagnetic pick-up heads. A good example of the latter type of linear motor forms the subject matter of U.S. Pat. No. 3,760,206 issued Sept. 18, 1973.

The linear motor of this patent has a high response rate contributed to by a coil assembly or armature preferably made of a lightweight, thin-walled plastic tube about which a conductor is coiled. The armature is slidable along a guide trace on low cost lightweight slide bearings. Despite this desirable type of construction on the linear motor designed along the teachings of this patent can not provide sufficient power output to satisfy applications where any significant work is required.

SUMMARY OF THE INVENTION

The present invention provides a linear motor, designed particularly for use in household sewing machines and the like, which has high acceleration, characteristics by which a system with substantially no inertial overthrow can be attained, limited but very accurate armature travel, and most importantly low inertia with adequate output force in a controlled size of unit.

Generally speaking, a linear motor constructed in accordance with the present invention comprises a metal frame structure having a four sided closed loop formation. Spanning two opposite sides of the frame is a single pole piece having a non-circular cross section. Slidable on the single pole piece is a plastic member having a coil of wire wound on its periphery to a depth of a plurality of turns of wire, the coil is adapted to ineract with a field produced by two permanent magnets secured by their magnetic force to the other two internal surfaces of the frame walls. The magnets are each locked in proper orientation by their own non-metallic retainer shaped tightly to embrace the four sides of the magnet and additionally to form panels cooperating with the closed loop frame completely to enclose the compartment which accommodates the coil thereby to effect both a minimum external leakage of magnetic field adn a dust proof motor.

As a consequence of the many advantages afforded by the present invention, a linear motor is provided which involves very low inertia but is capable of exerting a relatively large force, which has low power consumption when equated to the force generated, and which is small in external size and is substantially dust proof.

DESCRIPTION OF THE PREFERRED EMBODIMENT

Figure 1:
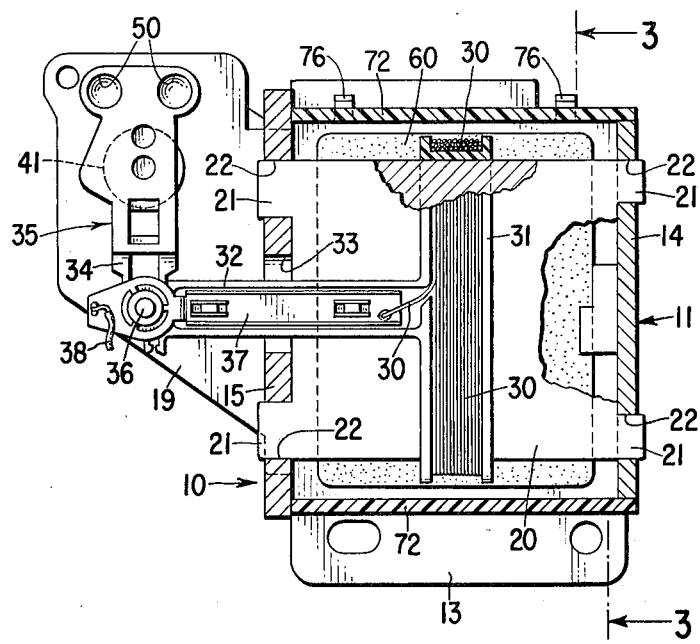
FIG. 1 is a vertical sectional view of a linear motor constructed in accordance with the present invention.
Figure 4:
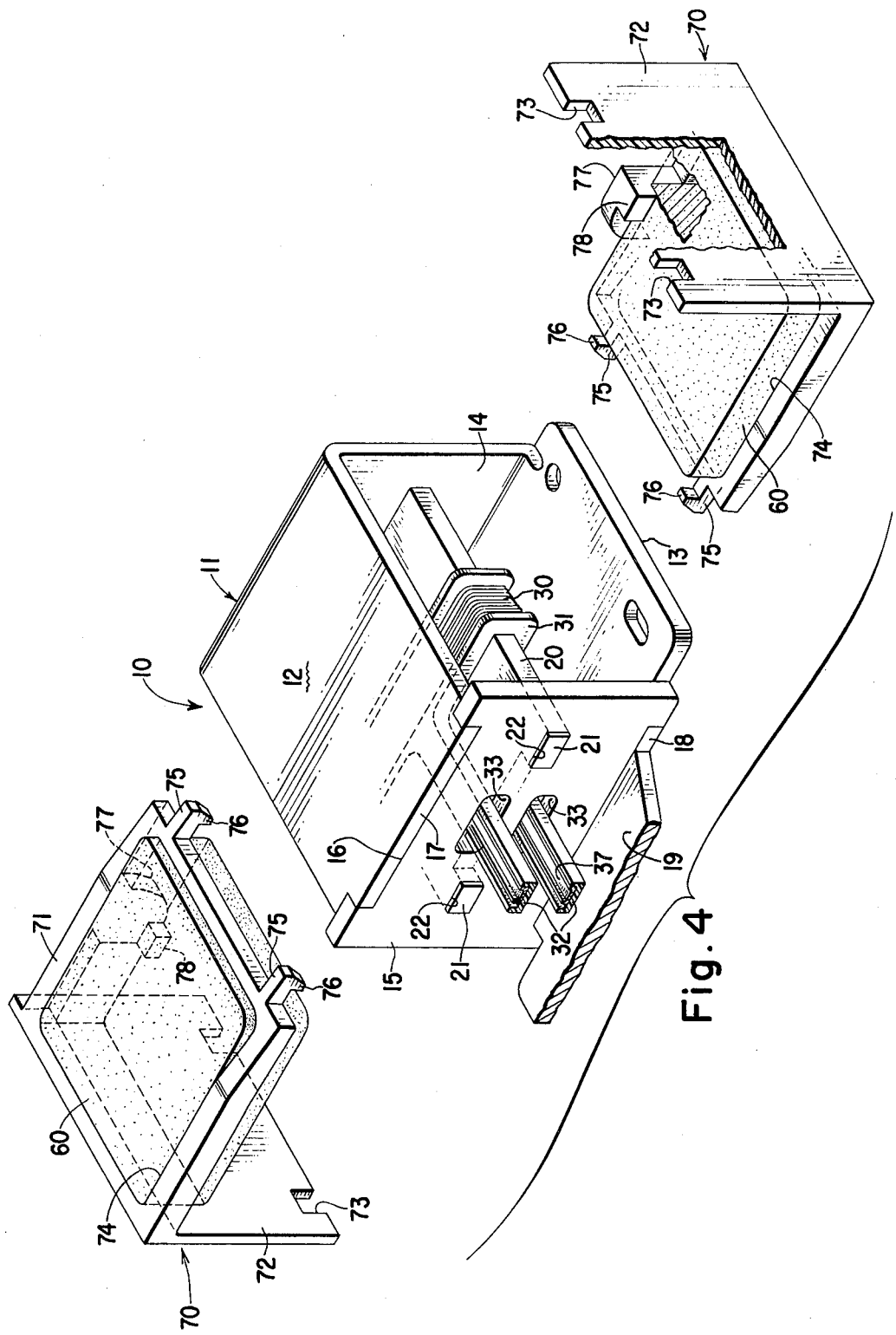
FIG. 4 is an enlarged disassembled perspective view, partly in section, showing in detail the two permanent magnets and the plastic retainers for assisting in securing the magnets in proper position during any accidental jarring of the motor or of the equipment in which the motor is incorporated

Referring to FIGS. 1 and 4, a linear motor indicated generally as 10 is shown adapted for use preferably to impart needle zigzag motion or to impart work feed controlling movements in a household sewing machine having a laterally zigzagging needle and a fabric feeding mechanism cooperating to produce ornamental pattern stitching. A sewing machine to which a linear motor of this invention may have utility is disclosed in the U.S. patent application Ser. No. 431,649 filed Jan. 8, 1974 of Philip F. Minalga which is incorporated herein by reference.

Generally the motor 10 comprises a four-sided box-like ferro magnetic metal frame including a U-shaped portion 11 formed with opposed front and rear walls 12 and 13 and one end wall 14 extending integrally therebetween. An opposite end wall 15 is recessed on opposite sides as at 16 to accommodate a tab 17 extending from the front wall 12 and a shoulder 18 formed at the juncture of the rear wall 13 and an extension 19 thereof. Spanning the end walls 14 and 15 is a ferro magnetic non-circular metal pole piece 20 formed with protuberances 21 at its ends which are fitted into apertures 22 in the end walls 14 and 15. The protuberances 21 are staked or otherwise deformed beyond the end walls 14 and 15 thus to lock the metallic frame parts together. Embracing the pole piece 20 and freely slidable endwise thereon is a coil of electrically conductive wire indicated generally at 30 supported on a bobbin 31 preferably made of a synthetic plastic material. The bobbin 31 has the wire 30 wound on it to a depth of a plurality of diameters of the wire as shown in FIG. 1.

Extending from the bobbin 31 and preferably formed integrally therewith of the same synthetic plastic material, are a pair of connecting arms 32 which extend each through a clearance aperture 33 in the end wall 15 of the frame. The connecting arms 32 at their free extremities staddle one limb 34 of a force transmitting lever 35 and are connected to the limb 34 by a pivot pin 36. Electrically conductive strips 37 set into the connecting arms 32 are connected electrically each to one end of the wire coil 31, and leads 38 extend from the strips 37 to connector pins 39—39 of a junction block 40 from which a separable connection may be readily made for instance, to a system such as is disclosed in the above referenced U.S. patent application Ser. No. 431,649.

Figure 2:
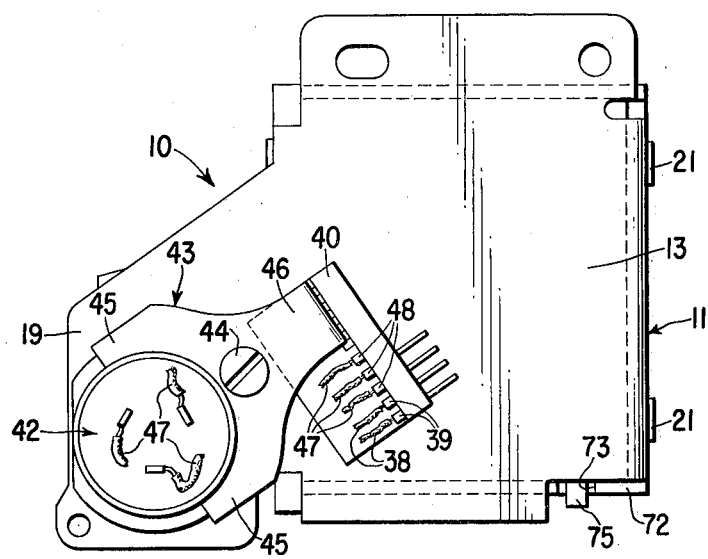
FIG. 2 is a rear elevational view of the motor shown in FIG. 1.

The force transmitting lever 35 is carried for turning movement on a shaft 41 which is journaled transversely in the extension 19 of the motor frame rear wall 13. Preferably the shaft 41 is associated with a potentiometer 42 arranged at the opposite side of the extension 19 from the force transmitting lever 35. As shown in FIG. 2 the potentiometer is secured to the extension 19 by a clamp bracket 43 which is attached to the extension 19 by a fastening screw 44. The clamp bracket is formed at one side of the fastening screw 44 with bifurcated arms 45 which embrace the potentiometer and is formed at the opposite side of the fastening screw wth an arm 46 which bears against the junction block 40. The clamp bracket 43 thus holds both the potentiometer and the junction block securely in place on the frame extension 19. Electrical leads 47 extend from the potentiometer to connector pins 48 on the junction block 40 for transmission of electrical signals from the potentiometer reflecting the angular position of the shaft 41.

Means are provided for attaching a driven element to the force transmitting lever 35 as for instance the semi-spherical depressions 50 which provide seats fr attachment of antifriction connection elements (not shown).

Figure 3:
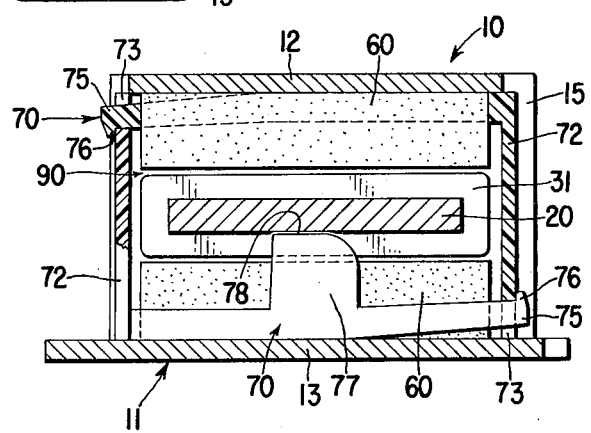
FIG. 3 is a cross sectional view taken substantially along the line 3—3 of FIG. 1.

Referring particularly to FIGS. 3 and 4, the motor 10 includes two permanent magnet blocks 60 arranged within the frame 11 one between each of the walls 12 and 13 and the pole piece 20. Since each of the magnets as well as the means for locating and retaining it is identical to the other a detailed description of only one will be given.

The permanent magnet block 60 is preferablg parallelepiped shape and is fabricated of a sintered permanently-magnetizable material. Preferably the sintered magnets may be fabricated of Ceramic No. 7 material, as for instance ARNOX No. 7 prepared by Arnold Engineering Co., Marengo, Ill. When the block 60 is inserted in the space between the frame 11 and the pole piece it will adhere magnetically to the wall 12 or 13 as shown in FIG. 3. The block 60 is located and retained in the frame 11 by a holder indicated generally at 70 which is preferably made of non-magnetic material wich is slightly flexible such as synthetic plastic, hard rubber or the like. The holder is formed with mutually perpendicular sections 71 and 72, the section 72 being substantially of the same shape as that delineated by the walls 12, 13, 14 and 15 of the motor frame and continuous but for two spaced notches 73—73 along the free extremity thereof. The section 71 is formed with a rectangular central opening 74 sized to accomodate the permanent magnet block 60. At the free extremity the section 71 is formed with two projections 75—75 having the same spacing as the notches 73—73 in the section 72. The projections are formed each with a lateral offset 76. Along one side of the section 71 a spacer 77 is formed extending prependicular thereto and having a dimension which as shown in FIG. 3 is equal to the spacing between the front and rear frame wall 12 or 13 and the pole piece 20. As shown in FIG. 4 the spacer 77 extends alongside the magnet block and is formed with a lateral tang 78 which projects over the magnet block. In assembling the motor 10, after the bobbin 31 has been placed on the pole piece 20 and the protuberances 21 have been staked to secure the metallic frame parts together, the magnet blocks 60 each fitted into one of the holders 70 are slid into the motor frame from opposite sides with the sections 72 extending in opposite directions as shown in FIG. 4. The projections 75—75 of one holder will fit through the notches 73—73 of the other holder and the offsets 76 will snap beyond the respective section 72 as shown in FIG. 3 to lock the holders in final assembled position.

The projections 77 insure that the magnet blocks 60 are retained against the frame walls and cannot accidentally shift toward the coil carrying bobbin 31, for instance, if a shock load is applied to the motor. The sections 72 of the holders completely close off the motor frame ends and with the metallic frame walls 12, 13, 14 and 15 define a closed compartment 90 for the coil carrying bobbin 31 thus preventing dust or other contaminants from entering the critical area of the motor. Since the holders 70 and the magnets 60 are identical, inventory problems are obviated and thus a simple and inexpensive linear motor is provided by the construction of this invention.

Since the permanent magnets 60 are maintained against the frame walls 12 and 13, appreciable space is provided between the magnet blocks 60 and the pole piece 20 for the accommodation of a plurality of layers of wire in the coil on the bobbin 31. A linear motor thus results which is capable of providing work output of a considerable magnitude. It as been found that an air gap between the magnet blocks 60 and the pole piece equal to 40% of the thickness of the magnet block can be effectually maintained by the construction of this invention.

The linear motor of this invention is particulary useful for actuating the needle jogging motion or work feed control in an ornamental sewing machine in conjunction with a servo system in which an analog pattern signal is used in comparison with a signal from the potentiometer to generate an error signal applied so as to influence operation of the motor. The compact arrangement of this invention in which the potentiometer shaft is journaled directly in an extension of the motor frame minimizes the buildup of tolerances between the motor and the potentiometer thus contributing to a desirable accuracy of response of the unit. Also contributing to the simplicity and compact arrangement provided by this invention is the construction in which the path of motion of the bobbin 31 is influenced by the pivotal connection 36 of the connecting arms 32 with the force transmitting lever 35 on the potentiometer shaft 41.

Having set forth the nature of this invention, what is claimed herein is:

1. A linear motor comprising a ferro-magnetic metal frame including an opposed set of front and rear walls joined by an opposed set of end walls together defining a enclosure, a non-circular ferro-magnetic pole piece spanning one of said sets of opposed frame walls within said enclosure, a bobbin formed of non-magnetizable material arranged freely slidable on said pole piece within said enclosure, wire wound in a coil on said bobbin to a depth of a plurality of wire diameters, a motor output arm connected to said bobbin and extending out through a clearance aperture in said motor frame enclosure, a block of permanently magnetized material in the shape of a parallelepiped of substantially uniform thickness dimension insertible with clearance within said enclosure in the space between said pole piece and a wall of said motor frame with the uniform thickness dimension being arranged extending between said frame wall and said pole piece, and holding means formed of non-magnetic material for constraining said block of permanently magnetized material in a position against said motor frame wall so as to locate all of said clearance between the pole piece and said block of permanently magnetized material.

2. A linear motor comprising a ferro-magnetic metal frame including an opposed set of front and rear walls joined by an opposed set of end walls together defining an enclosure, a non-circular ferro-magnetic pole piece spannig one of said sets of opposed framewalls within said enclosure, a bobbin formed of non-magnetizable material arranged freely slidable on said pole piece within said enclosure, wire wound in a coil on said bobbin to a depth of a plurality of wire diameters, a motor output arm connected to said bobbin and extending out through a clearance aperture in said motor frame enclosure, a block of permanently magnetized material insertible with clearance within said enclosure in the space between said pole piece and a wall of said motor frame, and a holder member formed of nonmagnetic material fitted together with said block of permanently magnetized material in the space between pole piece and said motor frame wall for constraining said block of permanently magnetized material in position against said motor frame wall so as to locate all of said clearance between the pole piece and said block of permanently magnetized material.

3. A linear motor as set forth in claim 2 in which said block of permanently magnetized material is formed of Ceramic No. 7 material in the shape of a parallelepiped of substantially uniform thickness dimension, said block of permanently magnetized material being positioned within said enclosure with the uniform thickness dimension being arranged extending between said frame wall and said pole piece, and in which the ratio of said thickness dimension to said clearance between the pole piece and the block of permanently magnetized material is less than 4 to 1.

4. A linear motor as set forth in claim 2 in which two blocks of permanently magnetized material are provided one on each side of said pole piece, and an individual holder member is associated with each of said two blocks of permanently magnetized material, and in which each of said blocks of permanently magnetized material and associated holder member is identical and interchangeable.

5. A linear motor as set forth in claim 4 in which each holder member comprises mutually perpendicular sections including a first section formed with a central aperture shaped to encompass one of said blocks of permanently magnetized material, and a second section which is substantially continuous and has a shape substantially similar and at least as large as that delineated by the front, rear, and end walls of the motor frame enclosure, and interlocking means formed on the free extremities of said mutually perpendicular older member section for securing together the two holder members with the associated blocks of permanently magnetized material arranged within the motor frame enclosure.

6. A linear motor as set forth in claim 5 in which the first section of said holder member is formed of substantially uniform thickness which is arranged to extend parallel to the thickness dimension of a block permanently magnetized material embraced in said aperture, a spacer extending from said first section of said holder member alongside said aperture, said spacer taken together with said holder member extending a distance perpendicular to said aperture which is substantially equal to the spacing between said motor frame wall and said pole piece, and a tang formed on the free extremeity of said spacer and over-hanging said aperture, said tang having a thickness which is substantially equal to all of the clearance between the pole piece and said block of permanently magnetized material.

7. A linear motor as set forth in claim 1 and adapted for actuating the needle jogging motion of a zig-zag sewing machine in conjunction with a servo system, in which one wall of said motor frame substantially parallel to said pole piece is extended outwardly beyond that wall of said motor frame in which said clearance opening is formed for said motor ouput arm, a shaft journaled in said motor frame extension substantially perpendicular to said pole piece, position sensing means carried by said shaft for reflecting the angular position of said shaft, and a lever carried by said shaft and pivotally connected to said motor output arm.

8. A linear motor as set forth in claim 1, in which a position sensing means including an oscillating shaft is provided, a bearing means for supporting said position sensing shaft is carried externally of that wall of said motor frame through which said clearance opening is formed for said motor output arm, and in which means oscillatable with said shaft is connected to said motor output arm to influence the path of motion thereof.

* * * * *